Jan. 19, 1954      B. R. LÉVY      2,666,870

SIGNAL SYSTEM FOR VEHICLES

Filed April 11, 1950

INVENTOR.

Bohor Robert Levy

BY

Glascock Downing Seebold

Attorneys.

Patented Jan. 19, 1954

2,666,870

UNITED STATES PATENT OFFICE 2,666,870

SIGNAL SYSTEM FOR VEHICLES

Bohor Robert Lévy, Choisy-le-Roi, France

Application April 11, 1950, Serial No. 155,141

Claims priority, application France April 14, 1949

2 Claims. (Cl. 315—217)

This invention relates to devices for intermittently interrupting an electric circuit, particularly for vehicle signal systems.

In most known devices of this type, the control of the interruption is effected by bi-metal thermo-couples acting upon a thermostat or the like, the operation of which is not entirely satisfactory and the life of which is usually short. Bi-metal interrupters also have the drawback of probable defective contacts. Furthermore, they are dependent upon the ambient temperature, which is particularly inconvenient when the device is used at very low temperatures.

The invention has for its object to provide a device for periodically interrupting at least one electric circuit, said device being non-responsive to temperature variations and having no frail or delicate part, while operating safely to completely close said circuit automatically and periodically within a predetermined time, as well as to completely interrupt said circuit within another well defined time, so that said device is particularly adapted to be used with signal systems for vehicles and still more particularly for intermittent lights, luminous oscillating arms or the like.

According to the invention, a device for intermittently interrupting at least one electric circuit comprises a mercury switch of the tiltable type, means to continuously urge said switch into its closing position and at least one electromagnet adapted to bring, when energized, through its movable member, said switch into opening position against the action of said means, the energizing of said electromagnet and the feeding of said circuit taking place through said switch.

Another object of the invention is to provide a device of the type described, in which said means are constituted by the force resulting from the action of gravity upon the various movable members of the device.

The device according to the invention may be easily connected in any circuit to be controlled, and in an operating circuit for its magnet, from suitably selected points of conductors interconnecting in series the coil of said magnet and said switch.

Another object of the invention is to provide a signal system, in particular for vehicles, in which a device of the type described cooperates with a circuit comprising at least two signals adapted to be fed from a suitable current source through said device, preferably with intermittently interrupted current.

According to another feature of the invention, said signal system is completed by a manually controlled switch capable of short-circuiting the automatic mercury switch, so that the signaling lights may be used as parking lights.

The selective use of the same lamps as parking or blinking lights is further made possible, due to the fact that the device according to the invention can be fed with current having a strength sufficient to ensure the feeding of the parking lights, which is usually impossible, in particular with a conventional thermostat system.

Other objects and advantages of the invention will appear from the following description referring to the accompanying drawings in which one embodiment of the invention has been shown as an illustration.

Figure 2:
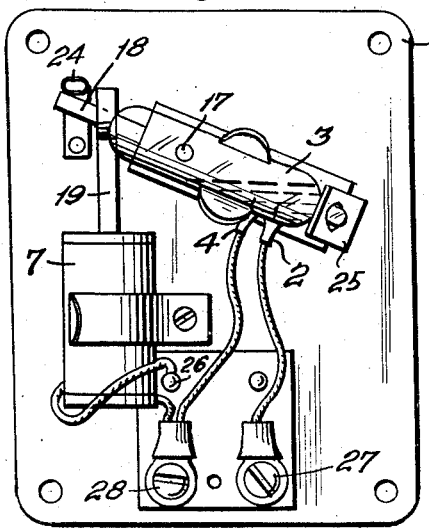
Fig. 2 is a side view of said interrupter.
Figure 3:
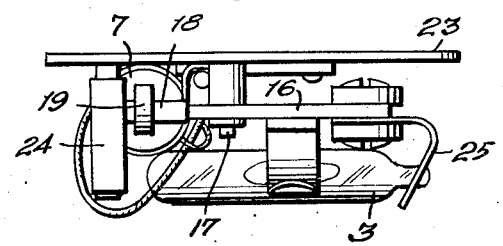
Fig. 3 is a plan view corresponding to Fig. 2.

In the example shown in Figs. 2 and 3, the automatic interrupting device according to the invention comprises a bearer 16 tiltably mounted about a pivot 17 on a supporting plate 23. A mercury switch 3 is adjustably secured on bearer 16, so as to be tiltable therewith. At one end of the mercury switch 3, two conductors 2 and 4 are so secured that the ends of said conductors project into the mercury container, thus constituting the interrupting contacts of the mercury switch. Conductor 2 is connected to a terminal 27. Conductor 4 is connected to one end 5 of the operating coil of an electromagnet 7, secured on the supporting plate 23 through a terminal 28. The other end of said coil is brought to a terminal 26.

The operating circuit of electromagnet 7 must be connected to terminals 26—27 so as to pass through contacts 2—4. The circuit to be controlled may be either interposed in series in said operating circuit or connected, in parallel therewith, to terminals 27—28, which is the case, e. g. in the wiring diagram of Fig. 1.

In the example shown, electromagnet 7 is of the sucking coil type. Its plunging core has the shape of a freely movable rod 19, the outer end of which is provided with an eyelet 24 in which is engaged a stud 18 which cooperates, on bearer 16 and, more precisely, on the end thereof which is opposite to the switch contacts, with an abutment 25 which is so located on said supporting plate 23 as to limit in one direction the tilting stroke of bearer 16 as soon as the mercury switch 3 has been brought back into its normal resting position under the action of gravity.

As soon as a circuit fed from a suitable current source is completed through terminals 26 and 27 and the resting mercury, the coil of magnet 7 is energized so that the same attracts core 19 to tilt the assembly comprising bearer 16 and mercury switch 3 against the action of gravity. The mercury thus flows into a position in which conductors 2 and 4 are no longer interconnected. At this moment, electromagnet 7 is no longer energized and releases core 19, so that all freely movable members of the device are brought back by gravity into their original resting position, in which the mercury establishes once more a contact between conductors 2 and 4, whereupon this operation cycle is renewed as long as the circuit is fed. In these conditions, it is clear that any circuit completed through contacts 2 and 4 will be fed intermittently within well defined periods, the duration of which may be predetermined, while the duration of the intermediate periods during which said feeding is interrupted may also be predetermined so that, with the device according to the invention, it becomes possible to generate various signals (for example blinking signals providing short light pulses recurring at a comparatively low frequency or conversely long duration light pulses separated by comparatively short black-out intervals).

Figure 1:
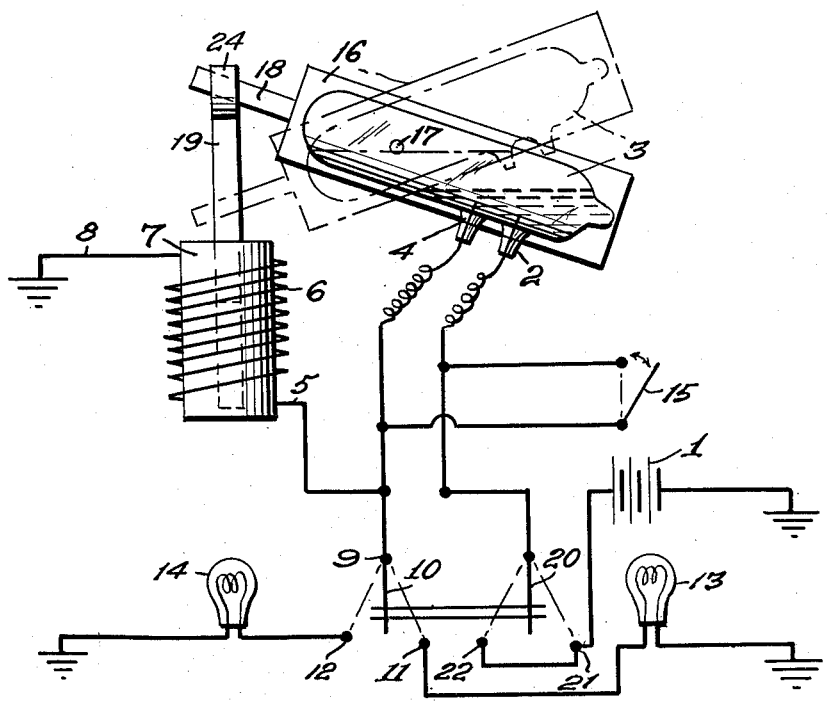
Fig. 1 is a wiring diagram of a signal system controlled by an automatic interrupter according to the invention.

A signal system which may be used for example in motorcars is described hereafter with reference to Fig. 1.

There is shown at 1 a battery having its negative terminal grounded while its positive terminal is connected to one contact 2 of mercury switch 3, through terminals 21 or 22 of a reversing switch 20. The signal lights are constituted in this example by two lamps 13 and 14 which are arranged in suitable parts of the vehicle. They may be used for example as turn indicating blinking lights. Both lamps 13 and 14 are grounded on one side, while, on the other side, each of them is connected to a stationary contact 11 and 12 respectively of a second reversing switch 10, the movable contact of which is interconnected with conductor 4 interposed between switch 3 and the end 5 of coil 6 of electromagnet 7, while the other end 8 of coil 6 is also grounded. Switches 10 and 20 may be ganged. Moreover, the above described signal system may be completed by a manually controlled switch 15 which is so mounted as to permit short-circuiting the automatic mercury switch 3.

This signal system operates as follows:

If, for example, lamp 14 is to be used as a blinking signal, it suffices, after having opened switch 15, to bring the movable arm 10 from the neutral position shown in Fig. 1 into contact with terminal 12, which brings simultaneously the movable arm 20 which was originally in a neutral position into contact with terminal 22, thus establishing a connection between the positive terminal of battery 1 and contact 2 of the mercury switch 3, the mercury mass of which establishes in turn a connection between said contact 2 and the grounded end 8 of coil 6, said connection taking place through contact 4 connected with end 5 of said coil. The current flowing from battery 1 through contacts 2 and 4 and coil 6 to ground also flows to ground in parallel from contact 4 through terminals 9 and 12 and lamp 14, so that the current simultaneously causes illumination of lamp 14 and the operation of electromagnet 7 which acts in turn upon the mercury switch 3, which results in the latter interrupting, after a predetermined time, the connection between battery 1 and contact 4 so that lamp 14 is cut off. At the same time the electromagnet 7 releases and acts no longer upon mercury switch 3 which then, after another well defined time, assumes its original resting position anew, so that lamp 14 is once more illuminated while electromagnet 7 is once more energized.

It will be understood that the same process goes on as long as the reversing switch 10 further establishes the connection between terminals 9 and 12 and that the signal system acts in the same manner upon lamp 13 when the reversing switch 10 connects terminal 9 with terminal 11.

Now, if either lamp 13 or 14 is to be used as a parking light, it suffices to close switch 15 for short-circuiting the automatic mercury switch 3, whereupon, if the reversing switch 10 is brought into contact with either terminal 11 or terminal 12, the corresponding lamp 13 or 14 is continuously illuminated.

It is to be understood that the invention is in no way limited to the embodiments described and shown and that many modifications may be made thereto within the scope of the invention. In particular, the core of electromagnet 7, instead of being movable as described, may be stationary while pin 18 of bearer 16 may be designed as an armature, in which case the mechanical link between bearer 16 and the core of the electromagnet may be omitted.

What is claimed is:

1. A signal system for vehicles equipped with a pair of signal lights, comprising, in combination, a source of current, a circuit connecting one side of each light to said source, a manually operable changeover switch in said circuit having a neutral position in which said circuit is opened and a pair of selective contacts connected to said respective lights, an interrupter in said circuit comprising a tiltable support, a mercury switch carried by said support and having a pair of spaced terminals at one end thereof connected between said changeover switch and said source, a magnet connected through said switch to said source via said interrupter and arranged to tilt said support against gravity to open its contact terminals, whereby to periodically interrupt the circuit through the selected light when said changeover switch is in its corresponding position, and a second manually operable switch connected across the terminals of said mercury switch for feeding only a selected one of said lights with a continuous uninterrupted current.

2. A signal system for vehicles equipped with a pair of signal lights, comprising, in combination, a source of current, a circuit connecting one side of each light to said source, a manually operable changeover switch in said circuit having a neutral position in which said circuit is opened and a pair of selective contacts connected to said respective lights, an interrupter in said circuit comprising a tiltable support, a mercury switch tube having a pair of spaced terminals at one end thereof connected between said changeover switch and said source, means to adjustably secure said tube on said support to normally close the contact between said two terminals by gravity, an electromagnetic coil connected through said changeover switch to said source via said interrupter, an axially movable core actuated by said coil, and means to link said movable core with said support to tilt the same against gravity to open the contact between said terminals when said core is attracted into said coil so as intermittently to interrupt the circuit through the selected light when said changeover switch is in its corresponding position, and a second manually operable switch connected across the terminals of said mercury switch for disabling the same and for feeding a selected one of said lights with a continuous uninterrupted current, in accordance with the position of said changeover switch.

BOHOR ROBERT LÉVY.

References Cited in the file of this patent

UNITED STATES PATENTS

| Number | Name | Date |
|---|---|---|
| 1,791,945 | Walker | Feb. 10, 1931 |
| 2,043,461 | Phillips | June 9, 1936 |
| 2,122,508 | Bell | July 5, 1938 |
| 2,238,394 | Murray | Apr. 15, 1941 |
| 2,300,896 | Hosmer | Nov. 3, 1942 |
| 2,440,028 | Swisher | Apr. 20, 1948 |
| 2,514,604 | Hollins | July 11, 1950 |